(12) United States Patent
Lippert et al.

(10) Patent No.: US 8,121,798 B2
(45) Date of Patent: Feb. 21, 2012

(54) GAS FLUX DETERMINATION USING AIRBORNE DIAL LIDAR AND AIRBORNE WIND MEASUREMENT

(75) Inventors: Joseph Lawrence Lippert, Rochester, NY (US); Steven Vincent Stearns, Vienna, VA (US); Daniel Everett Brake, Fairport, NY (US); Caren M. Fisher, Rochester, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 12/639,364

(22) Filed: Dec. 16, 2009

(65) Prior Publication Data

US 2010/0131207 A1     May 27, 2010

Related U.S. Application Data

(63) Continuation-in-part of application No. 12/276,686, filed on Nov. 24, 2008, now Pat. No. 8,010,300.

(51) Int. Cl.
*G01N 31/00*     (2006.01)

(52) U.S. Cl. .......................................... 702/24; 356/437

(58) Field of Classification Search ................... 702/24, 702/49
See application file for complete search history.

(56) References Cited

U.S. PATENT DOCUMENTS

| | | |
|---|---|---|
| 4,001,764 A | 1/1977 | Holland et al. |
| 4,450,356 A | 5/1984 | Murray et al. |
| 4,489,239 A | 12/1984 | Grant et al. |
| 4,870,275 A | 9/1989 | Ozdemir et al. |
| 4,871,916 A | 10/1989 | Scott |
| 5,166,789 A | 11/1992 | Myrick |
| 5,250,810 A | 10/1993 | Geiger |
| 5,410,154 A | 4/1995 | Broicher et al. |

(Continued)

FOREIGN PATENT DOCUMENTS

CA     2655279     3/2009

(Continued)

OTHER PUBLICATIONS

Daniel Brake et al., "New Airborne Remote Sensing Service Enhances Pipeline Integrity Assessment", Pipeline & Gas Journal, vol. 231, No. 6, Jul. 2004.*

(Continued)

*Primary Examiner* — Eliseo Ramos Feliciano
*Assistant Examiner* — Alexander Satanovsky
(74) *Attorney, Agent, or Firm* — RatnerPrestia

(57) ABSTRACT

A system for obtaining emission flux of a gas plume, emanating from a source, includes an airborne differential absorption lidar (DIAL) system for determining multiple concentration path length (CPL) values along a flight path; and an airborne wind measuring system (WMS) for determining a wind vector at the aircraft altitude. Also included is a processor for receiving the multiple CPL values determined by the DIAL system and the wind vector determined by the WMS. The processor uses the CPL values to compute either (a) an area-integrated concentration (AIC) value or (b) an average concentration value over a cross-plume extent, defined along the length dimension of the flight path. The processor also scales the wind vector to the near ground altitude level of the gas plume to obtain a scaled wind vector. The emission flux is obtained by multiplying either the AIC value or the average concentration value with a component of the scaled wind vector. The component of the scaled wind vector is defined by a vector perpendicular to the length dimension of the flight path.

18 Claims, 6 Drawing Sheets

U.S. PATENT DOCUMENTS

| | | | |
|---|---|---|---|
| 5,481,476 | A | 1/1996 | Windig |
| 5,818,951 | A | 10/1998 | Schivley |
| 6,366,681 | B1 | 4/2002 | Hutchins |
| 6,509,566 | B1 | 1/2003 | Wamsley et al. |
| 6,646,725 | B1* | 11/2003 | Eichinger et al. ............... 356/28 |
| 6,725,705 | B1 | 4/2004 | Huebler et al. |
| 6,822,742 | B1 | 11/2004 | Kalayeh et al. |
| 6,864,983 | B2 | 3/2005 | Galle et al. |
| 2003/0009268 | A1 | 1/2003 | Inokuchi |
| 2003/0030001 | A1 | 2/2003 | Cooper |
| 2005/0010365 | A1* | 1/2005 | Chapman et al. .................. 702/3 |
| 2007/0061114 | A1 | 3/2007 | Kalayeh |
| 2007/0069941 | A1* | 3/2007 | Pearlman et al. ........... 342/26 B |
| 2008/0195329 | A1 | 8/2008 | Prince et al. |
| 2008/0210881 | A1* | 9/2008 | Harris et al. .................. 250/393 |
| 2010/0091267 | A1* | 4/2010 | Wong .............................. 356/51 |

FOREIGN PATENT DOCUMENTS

| | | | |
|---|---|---|---|
| EP | 0 489 546 | A | 6/1992 |
| WO | WO 2005/064316 | A1 | 7/2005 |

OTHER PUBLICATIONS

"AIMMS-20 Helicopter Option Takes Flight", Aventech Research Inc., Barrie, Ontario, Canada, Jun. 27, 2005, http://www.aventech.com/press/article_2005_6_27_1329.html.*

European Search Report mailed on Apr. 13, 2011, in related European Patent Application No. EP 10194444.5.

Notice of Allowance issued Apr. 27, 2011, in related U.S. Appl. No. 12/276,686, filed Nov. 24, 2008.

Werner Zirnig and Matthias Ulbricht, "Innovative Technologies Improve Environmental Protection—Detection of Gas Leaks by Helicopter-Borne Infrared Laser System".

Egor V. Degtiarev, Allen R. Geiger and Richard D. Richmond, "Compact mid-infrared DIAL lidar for ground-based and airborne pipeline monitoring". Remote sensing of Clouds and the Atmosphere VII, Klaus Schafer, Olga Lado-Bordowsky, Adolfo Comeron, Richard H. Picards, Editors. Proceedings of SPIE, vol. 4883, 2003.

S. Brunsgaard, R. W. Berg and E. H. Stenby, "High-Pressure Measuring Cell for Raman Spectroscopic Studies of Natural Gas", Applied Spectroscopy, vol. 55, No. 1, 2001, pp. 55-60.

Johan Mellqvist, Jerker Samuelsson and Claudia Rivera, Measurements of Industrial Emissions of VOCs, $NH_3$, $NO_2$, and $SO_2$ in Texas using the Solar Occultation Flux Method and Mobile DOAS, Radio and Space Scienc Chalmers University of Technology, pp. 1-20, Aug. 20, 2007.

Mitchell, Alexander, "Wind Velocities for Different Altitudes and Exposures," Monthly Weather Review, Apr. 1905.

Markowski, P., and Richardson, Yvette P., "A Survey of Mesoscale Meteorology," The Pennsylvania State University, Jan. 2006.

Stull, R.B., "An Introduction to Boundary Layer Meteorology". Kluwer Academic Publishers, Dordrecht, The Netherlands, 1988, pp. 11, 12, 18, 169, 376-381.

Danish Wind Industry Association, http://www.windpower.org/en/tour/wres/shear.htm.

Wong, Colin, U.S. Appl. No. 61/136,837, Non-Point Source Fugitive Emission Flux Measurement, Filed Oct. 8, 2008.

P.G. Hall et al., NOAA Technical Memorandum, ARL-257, Air Resources Laboratory, Tenness, 2006.

* cited by examiner

GAS FLUX DETERMINATION USING AIRBORNE DIAL LIDAR AND AIRBORNE WIND MEASUREMENT

RELATED APPLICATIONS

The present application is a Continuation-In-Part of U.S. patent application Ser. No. 12/276,686, filed Nov. 24, 2008, which is incorporated herein by reference in its entirety.

FIELD OF INVENTION

The present invention relates, in general, to the field of spectroscopic analysis of a gas plume. More specifically, the present invention relates to determining the emission rate, or flux of a gas plume emanating from a source, by using an aircraft that houses both a differential absorption LIDAR (DIAL) system and a wind measurement system. The present invention improves on the accuracy of the emission rate by scaling the airborne wind measurement from the aircraft's flying altitude to the gas plume's near ground altitude.

BACKGROUND OF THE INVENTION

Technologies available for the rate quantification of gas(es) emitted from a point source such as a smokestack or a leaking pipeline are numerous and well understood. These techniques include use of rotameters or hot-wire anemometers to measure the velocity of gases escaping from a hole of known size. Also included are more high tech devices like a Hi-Flow sampler which is an instrument that combines a hydrocarbon detector with a flow meter and vacuum system.

Measurement of emission flux from larger, more complex non-point sources of emissions may be accomplished by numerical calculations within the facility (for example, calculations based on amount of material lost), by direct point-sampling of the gas plume downwind of the source, or (most recently) by use of path integrated optical remote sensing. Non-point-source emissions of gases like methane and other volatile organic carbons (VOCs) are numerous and variable and include refineries, industrial complexes, sewage systems, tank farms, landfills, agricultural sites, coal mines, oil and gas exploration and production sites and pipeline networks. Measuring the emissions from these types of sites is made more difficult by the fact that exact sources of emission are not always known.

There are several optical technologies available to quantify the gases emitted from non-point sources. These optical technologies include Open-Path Fourier Transform InfraRed Spectroscopy (OP-FTIR), Ultra-Violet Differential Optical Absorption Spectroscopy (UV-DOAS), Tunable Diode Laser Spectroscopy (TDLAS), and Path Integrated Differential Absorption Lidar (PI-DIAL). These optical remote sensing technologies are all ground based, active optical instruments which pass light through a plume of gas and measure a path-integrated concentration of gas in the plume by detecting changes in light passing through the gas plume. Further, these technologies rely on one or more retro-reflectors or separate light sources and detectors on either side of the gas plume.

Measurement approaches include horizontal plume mapping, vertical plume mapping and one-dimensional mapping downwind of a plume. Another measurement technique is Solar Occultation Flux (SOF) which uses IR and the sun as an optical source from a fixed or moving ground-based platform.

Many of the conventional techniques for measurement of gaseous emission are ground-based and require long term (several days) access to sites and unobstructed optical paths down-wind of the emission source(s). Remote or hard to access sites are difficult and expensive to measure. In addition, measurements are time consuming and take days or weeks to complete as an operator waits for the right wind conditions to direct a plume to a designated optical measurement path.

Because shifts in wind speed and direction result in an ever-changing plume of gas from a site, combining instrument readings from different optical paths over a period of time results in inaccurate flux calculations. Instruments like the SOF, which rely on the sun as an illumination source, require low cloud cover and high sun angle to produce sufficient light for usable measurements. In addition, using the SOF requires access to the site and a drivable road some distance downwind of the gas source.

These techniques only allow a partial optical view of ground-hugging plumes, since the instruments are mounted on the tops or sides of vehicles and cannot make measurements fully extending to ground level. Further, these techniques only allow a near instantaneous (a few seconds at most) snapshot of an entire plume cross section by using a single non-average wind speed and direction when calculating flux.

Accurate wind measurement is a major source of error for these techniques because the wind is constantly shifting. As a result, pre-positioning retro-reflectors and optical detectors to provide usable flux calculation is largely guesswork and frequently requires subsequent deployment of more ground equipment. These techniques also require access of a truck or vehicle to the site, which typically has to be shipped in from overseas. Because of their complexity and time consumption, the cost of using these technologies is high. Only a handful of sites may be measured a year.

Optical remote sensing techniques, on the other hand, are more efficient and require less time to detect gas plumes, by using instrumentation mounted in a fixed wing aircraft that flies hundreds of feet above the gas plume. An example of such instrumentation is the DIAL (differential absorption LIDAR) system, also referred to herein as the ANGEL system. The ANGEL system is described in U.S. Pat. No. 6,822,742, which is incorporated herein by reference in its entirety.

Briefly, the ANGEL system includes a sensor for remote quantitative detection of fluid leaks from a natural gas or oil pipeline by use of an airborne platform. The system includes a laser light source for illuminating an area of target gases and background. The target gases may be characterized by one or more absorption wavelengths (also referred to as on-line). The background may be characterized by a non-absorbable wavelength (also referred to as off-line) that is different from the target gases.

For example, the ANGEL system may use a 3-line tunable DIAL laser system for measuring the concentration path-lengths (CPL) of two selected target gases. When the airborne platform reaches a target location, laser beams are automatically pointed to the target location for scanning the surrounding regions. The returned laser beams are analyzed to develop two-dimensional gas-maps or images of gases, such as methane and ethane, in units of CPL.

In a 2-line tunable DIAL laser system, for example, two single wavelength, laser pulses are transmitted. One laser pulse of a specific wavelength is chosen which is absorbed by the gas of interest, and the other laser pulse, chosen at a different wavelength, is not absorbed. The energy reflected back to the sensor for both wavelengths is measured to gen erate an estimate of the target CPL. The energy reflected back to the sensor is described by the following relationship:

$$E \propto \frac{E_T \rho_\pi \exp[-2(CL_p + C_{bg}R)\sigma(\lambda)]}{R^2},$$

where $E_T$ is the transmitted energy,
$\rho_\pi$ is the surface reflectance,
$CL_p$ (same as CPL) is the concentration-length product of the gas,
$C_{bg}$ is the background concentration of the gas,
R is the range to the surface, and
$\sigma(\lambda)$ is the absorption cross-section of the gas as a function of wavelength.

The target CPL is calculated in units of ppm-m (parts per million×meter).

As will be described, the present invention relates to determining the emission rate, or flux of a gas plume emanating from a source, by using an aircraft that houses both the differential absorption LIDAR (DIAL) system, or the ANGEL system, and an airborne wind measurement system. The present invention improves on the accuracy of the emission rate by scaling the airborne wind measurement from the aircraft's flying altitude to the gas plume's near ground altitude.

SUMMARY OF THE INVENTION

To meet this and other needs, and in view of its purposes, the present invention provides a system for determining emission rate of a gas from a source. The system includes an optical remote sensing system, disposed in an aircraft, for emitting an optical beam downwardly, along a length dimension of a flight path, and measuring differential absorption characteristics of the gas plume emitted at near ground level. Also included is a wind measuring system, disposed in the aircraft, for determining wind speed and wind heading at an altitude level of the aircraft. A processor determines emission rate of the gas plume, in response to (a) the differential absorption characteristics of the gas plume measured by the optical remote sensing system, and (b) the wind speed and wind heading determined by the wind measuring system.

The differential absorption characteristics include multiple concentration path length (CPL) values along a length dimension of the gas plume, and the length dimension of the gas plume is the same as the length dimension of the flight path. The CPL values are determined over an area defined by the length dimension of the gas plume and a width dimension, perpendicular to and smaller than the length dimension. The width dimension is at least a width dimension of the optical beam. The width dimension may also be a width dimension extended by the optical beam in a conical scan mode.

The differential absorption characteristics include multiple concentration path length (CPL) values along a length dimension of the flight path. The processor uses the multiple CPL values to determine either (a) an area-integrated concentration (AIC) value or (b) an average concentration value over a cross-plume extent, defined along the length dimension of the flight path. The processor receives the wind speed and wind heading from the wind measuring system and scales the wind speed from the aircraft altitude level to the near ground level of the gas plume.

The processor scales the wind speed based on imagery of the gas plume, and the aircraft altitude level. The processor also scales the wind speed based on a logarithmic function of a wind profile including a roughness length, and the roughness length is obtained from a look up table (LUT) stored in a memory device. The processor may adjust the wind heading received from the wind measuring system after a comparison to a wind heading received from a plume heading detector disposed in the aircraft. The processor then uses the adjusted wind heading in determining the emission rate of the gas plume.

The scaled wind speed and wind heading comprises a wind vector. The processor multiplies either (a) the determined area-integrated concentration (AIC) value or (b) the average concentration value with a component of the wind vector, in which the component is defined, by a vector perpendicular to the length dimension of the flight path.

Another embodiment of the present invention includes an airborne system for obtaining an emission flux measurement of a gas plume, emanating from a source at a near ground altitude level, comprising: (a) an airborne differential absorption lidar (DIAL) system for determining multiple concentration path length (CPL) values along a flight path; (b) an airborne wind measuring system (WMS) for determining a wind vector at aircraft altitude; and (c) a processor for receiving the multiple CPL values determined by the DIAL system and the wind vector determined by the WMS. The processor uses the CPL values to compute either (a) an area-integrated concentration (AIC) value or (b) an average concentration value over a cross-plume extent, defined along the length dimension of the flight path. The processor scales the wind vector to the near ground altitude level of the gas plume to obtain a scaled wind vector. The processor also obtains the emission flux by multiplying either the AIC value or the average concentration value with a component of the scaled wind vector. The component of the scaled wind vector is defined by a vector perpendicular to the length dimension of the flight path.

The cross plume extent includes a predetermined length spanning at least a portion of the gas plume. A width dimension is included perpendicular to and smaller than the cross plume extent having at least a width of an optical beam transmitted by the DIAL system. The processor computes the AIC value or the average concentration value using the CPL values in an area formed by the cross plume extent and the width dimension. The processor receives the CPL values along the cross plume extent substantially concurrently with the wind vector.

Yet another embodiment of the present invention is a method of obtaining emission flux of a gas plume from an emission source. The method includes the steps of:
(a) obtaining CPL values along an area determined by a cross plume extent and a width dimension, wherein the cross plume extent is along a length dimension of a flight path and the width dimension is perpendicular to the length dimension;
(b) receiving a wind vector from an onboard aircraft wind measuring system;
(c) computing either (a) an area-integrated concentration (AIC) value or (b) an average concentration value, using the CPL values along the area;
(d) scaling the wind vector to a near ground altitude level of the gas plume to obtain a scaled wind vector, and
(e) multiplying either the AIC value or the average concentration value with a component of the scaled wind vector to obtain the emission flux of the gas.

Multiplying with the component includes multiplying with a component of the scaled wind vector which is perpendicular to the cross plume extent.

Obtaining the CPL values along the cross plume extent is performed substantially concurrently with receiving the wind vector from the onboard aircraft wind measuring system.

Scaling the wind vector is based on a logarithmic function of a wind profile including a roughness length, and the roughness length is obtained from a look up table (LUT) stored in a memory device.

It is understood that the foregoing general description and the following detailed description are exemplary, but are not restrictive of the invention.

BRIEF DESCRIPTION OF THE FIGURES

The invention may be understood from the following detailed description when read in connection the accompanying figures.

DETAILED DESCRIPTION OF THE INVENTION

Figure 1:
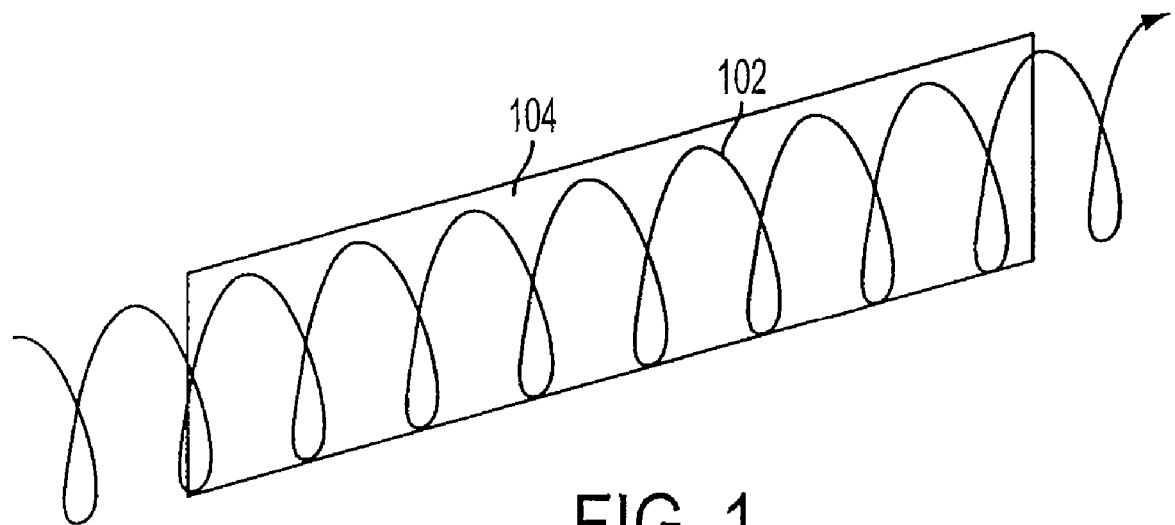
FIG. 1 is an exemplary illustration showing a laser conical scan illumination of a target area.
Figure 2:
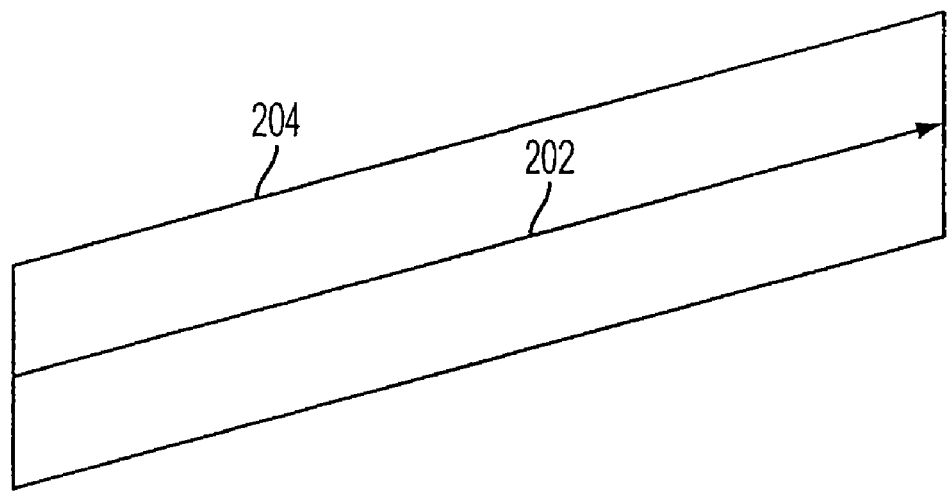
FIG. 2 is an exemplary illustration showing a laser straight line scan illumination of a target area.

Referring first to FIG. 1, laser light 102 transmitted from the ANGEL system illuminates target area 104 using a conical scan (scanner-on mode). Alternatively, laser light 202 transmitted from the ANGEL system may illuminate target area 204 in a straight line (scanner-off mode), as shown in FIG. 2. Both modes may be used by the present invention.

With the exception of deploying lightweight wind sensor instrumentation, the ANGEL system does not need to enter a site to make measurements. The system may fly at high speeds (i.e. 120 mph) and measure large plumes in seconds, in effect providing a snapshot of the plume in time. As a result, measurements taken by the ANGEL system are more accurate than other systems which attempt to quantify a moving plume in several pieces.

For example, at a flight speed of 120 mph and a transmission rate of 1,000 pulses/second, the pulses are spaced about 2 inches apart providing a "curtain" of gas measurements to fully capture a cross section of the plume. Because the laser light from the ANGEL system reflects off the ground surface, the entire height of the plume is measured all the way down to the ground, thereby resulting in a more accurate measurement. Because measurements are collected so rapidly, the wind direction may be factored into the data collection and the pilot may fly downwind of the site and have a higher likelihood of acquiring a cross section of the plume perpendicular to the wind direction. Further, because the ANGEL system collects data rapidly while airborne, multiple sites may be measured in a single day, much more efficiently than ground-based technologies.

According to an exemplary embodiment of the invention, the emission rate or flux may be determined from a gas source, such as methane, by flying down-wind and across the plume while measuring gas concentration (CPL or concentration×path length) from the airplane to the ground using an airborne measurement system, such as the ANGEL system, that has sufficient spatial density to map the cross-plume path concentration profile. The exemplary embodiments, however, are not limited to the measurements of methane. Any other gas, or multiple gases may be measured in a similar manner.

Figure 3:
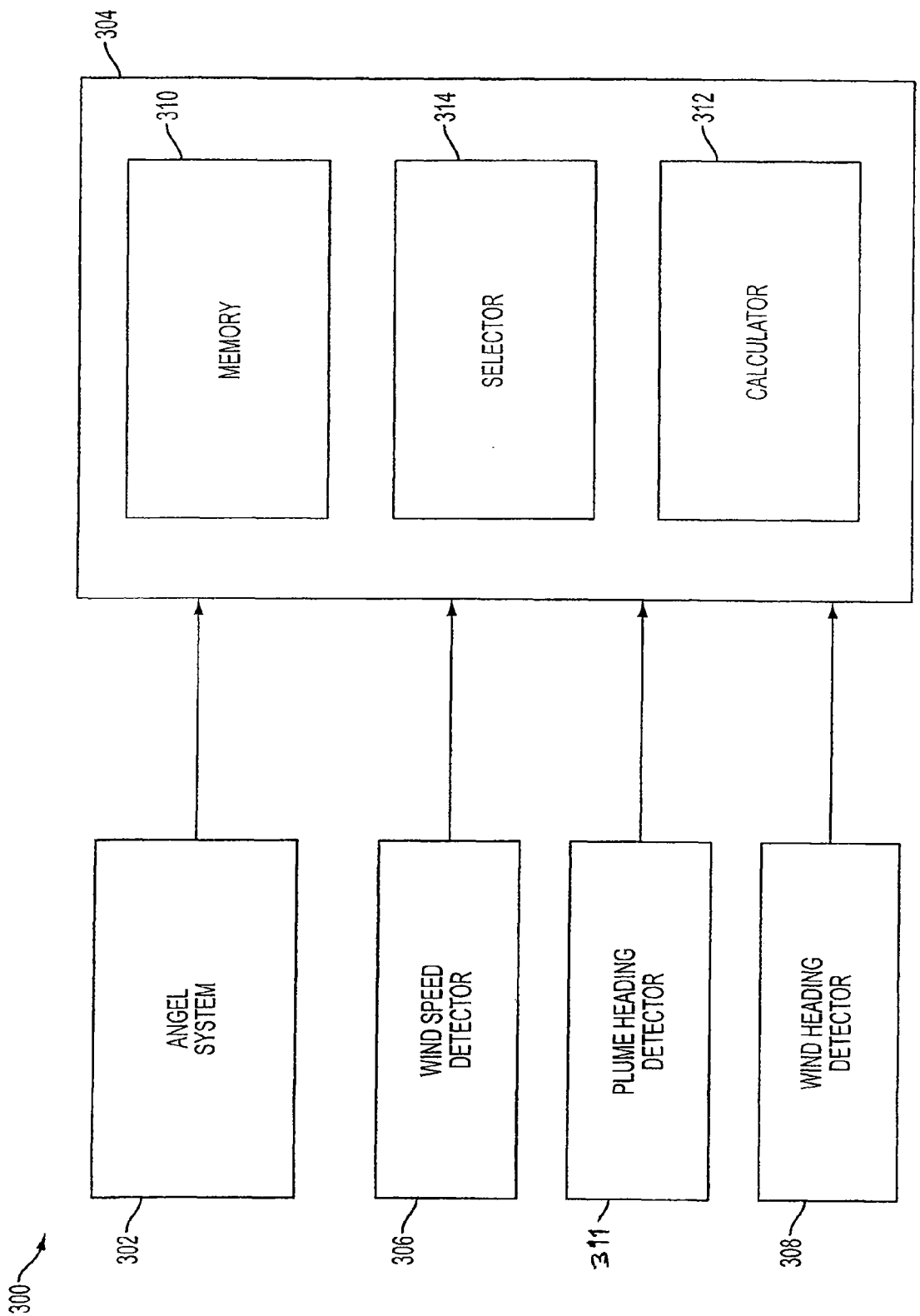
FIG. 3 is a block diagram of a system for determining emission rate of a gas, according to an exemplary embodiment of the present invention.

Referring next to FIG. 3, the present invention is exemplified in system 300 for determining the emission rate or flux of a gas source. The system 300 includes ANGEL system 302 and processor 304. The processor 304 may be hard wired to ANGEL system 302 or wirelessly linked to ANGEL system 302. Further, processor 304 may be disposed in close proximity to ANGEL system 302 or remotely from ANGEL system 302.

The system 300 also includes wind speed detector 306 and wind heading detector 308 for measuring wind speed and wind heading (direction) with respect to the gas plume. The wind speed and wind heading may be measured by local weather stations in the area. That is, the wind speed and wind heading may be measured remotely from the gas plume. Alternatively, wind measurements may be measured in close proximity to the gas plume. A plume heading detector may also be included, as shown by detector 311.

As shown in FIG. 3, processor 304 includes memory 310 for storing data provided from ANGEL system 302, wind speed detector 306 and wind heading detector 308. The processor 304 also includes a selector 314 for designating an in-plume area extending across a plume of gas having a length dimension greater than a width dimension. The processor 304 further includes a calculator 312 for calculating the emission rate or flux of the gas plume from the data stored in memory 310.

Figure 4:
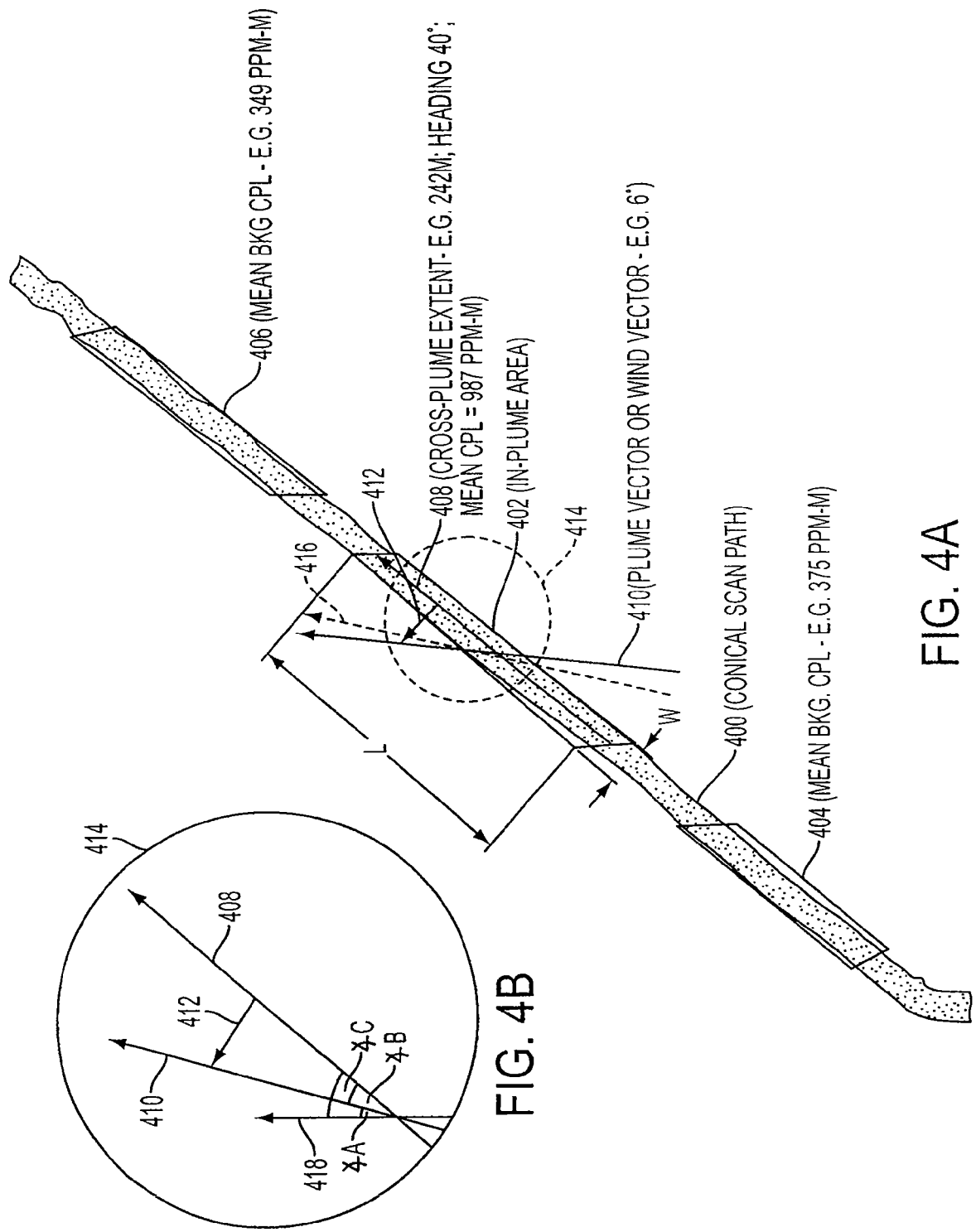
FIG. 4A is an exemplary top view of an area formed by a flight path of a laser conical scan illumination with respect to a gas plume.
FIG. 4B is an exploded view of a portion of the area formed by the flight path shown in FIG. 4A.

FIG. 4A is a top view of a path of a conically scanned laser light transmitted from the ANGEL system. As shown, conical scan path 400 traverses in-plume area 402 having a length dimension L greater than a width dimension W. Conical scan path 400 also traverses first area 404 adjacent to in-plume area 402 and second area 406 adjacent to in-plume area 402. The direction of cross plume extent 408 (the heading in which the cross-plume distance is measured) within in-plume area 402 is shown. The plume or wind vector 410, which may be resolved into cross-plume extent 408 and a perpendicular component 412, is also shown.

In operation, as conical scan path 400 traverses in-plume area 402 and adjacent background areas 404 and 406, ANGEL system 302 determines a plurality of CPL measurements for in-plume area 402 and both adjacent background areas 404 and 406. The CPL measurements include vertical CPL measurements in vertical paths from the airborne platform to the in-plume area 402 and adjacent background areas 404 and 406. The plurality of CPL measurements are provided to processor 304 and stored in memory 310 as CPL values.

Selector 314, which may be operator controlled, designates in-plume area 402 extending across a plume of gas. An area-integrated CPL concentration (AIC) value for in-plume area 402 may then be determined by calculator 312. The AIC value for in-plume area 402 is derived from the multiple CPL values found in in-plume area 402. The CPL values are integrated across the in-plume area by calculator 312 to produce the AIC value ($\S_{cross\text{-}plume}(CPL_{vertical})dL$) covering the entire length L and height of the plume. That is, the AIC value for in plume area 402 may be determined as $$(\S_{cross\text{-}plume}(CPL_{vertical})dL),$$

and incorporated into Equation (1), as shown below:

$$\text{Emission Rate} = (\S_{cross\text{-}plume}(CPL_{vertical})dL) \times v_{wind} \times \sin(\text{heading}_{cross\text{-}plume} - \text{heading}_{wind}), \quad (1)$$

where $v_{wind}$ is the measured wind speed,
$\text{heading}_{wind}$ is the measured wind heading,
$\text{heading}_{cross\text{-}plume}$ is the direction of cross plume extent 408 (the heading in which the cross-plume length L is measured), and
dL is the length differential.

Combining path-integrated gas measurements with measurements of wind speed and wind direction allows calculation of the amount of gas emitted from a location over time (flux).

The processor may determine the emission rate of the gas based on the AIC value and a vector component of the wind vector. The total flux or emission rate across the measured in-plume area (W×L) may be calculated by calculator 312 as a product of the AIC value and wind speed vector 412. It is noted that if the conical scan if off, then W is equal to unity. In other words, W is equal to the diameter size of the optical beam and only one CPL value is determined for each section of dL.

In practice, however, it may be easier to obtain a similar AIC value by averaging the plurality of CPL measurements for in-plume area 402 across the plume, producing an in-plume CPL average value, and then multiplying the in-plume CPL average value by the length L of in-plume area 402. That is, the average concentration value for in plume area 402 may be determined as the following average across the plume:

$$(\text{Avg}(CPL_{vertical})) \times L_{cross\text{-}plume},$$

and incorporated into Equation (2), as shown below:

$$\text{Emission Rate} = (\text{Avg}(CPL_{vertical})) \times L_{cross\text{-}plume} \times v_{wind} \times \sin(\text{heading}_{cross\text{-}plume} - \text{heading}_{wind}), \quad (2)$$

where $\text{Avg}(CPL_{vertical})$ is the in-plume CPL average along cross-plume extent 408 within in-plume area 402,
$L_{cross\text{-}plume}$ is the length of cross plume extent 408 (the length across the plume for which in-plume CPL is measured),
$v_{wind}$ is the measured wind speed,
$\text{heading}_{wind}$ is the measured wind heading, and
$\text{heading}_{cross\text{-}plume}$ is the direction of cross plume extent 408 (the heading in which the cross-plume length L is measured).

It is general practice to assume that the wind is the determining factor that carries a plume of gas downwind from its source. Accordingly, wind speed and wind heading may be used with AIC value for in-plume area 402 to determine the emission rate of a gas. The wind speed and wind heading combine to provide a wind vector, received by processor 304. The wind vector may be determined from wind speed ($v_{wind}$) and wind heading ($\text{heading}_{wind}$). The wind vector may also be determined from wind speed and plume heading. For example, the wind heading may be the same as the plume heading. Thus, plume heading 410 and wind heading 410 are both shown by the same arrow in FIG. 4A.

Wind heading, however, may not be the same as plume heading. If wind heading and plume heading are different, wind heading may either be plume heading 410 (direction of the plume), provided by plume heading detector 311 or wind heading (shown as dotted arrow 416), provided by wind heading detector 308. If plume heading 410 and wind heading 416 are different, it may then be more desirable to use plume heading 410. It may also be desirable to not use the calculation if the difference between plume heading 410 and average wind heading 416 is greater than a predetermined threshold.

The measured wind speed ($v_{wind}$) and wind heading ($\text{heading}_{wind}$) may be provided to processor 304 from a single weather station or multiple weather stations is in the vicinity of in-plume area 402. For example, the measured wind speed provided to processor 304 may be an average wind speed averaged from multiple weather stations (i.e. 7-11 mph and 0-8 mph) and wind heading may be an average of wind headings from multiple weather stations (i.e. S-SSW=0-15° and SSW=15°).

According to one exemplary embodiment, multiple calculations may be used to determine the emission rate. For example, a first calculation may use the lowest wind speed and heading. A second calculation may use the highest wind speed and heading. A third calculation may use the average wind speed and heading.

The wind measurements may be detected by wind detector 306 in close proximity to the gas plume without using data from weather stations in the area. That is, with reference to FIG. 4A, the measured wind speed and wind heading provided to processor 304 may be determined in close proximity to in-plume area 402.

The wind vector may be resolved into a vector 412, which is perpendicular to cross-plume extent 408 (or perpendicular to the length dimension L of in-plume area 402). The vector 412 may be calculated by the term $v_{wind} \times \sin(\text{heading}_{cross\text{-}plume} - \text{heading}_{wind})$, shown in Equations (1) and (2).

FIG. 4B, which is an exploded view of section 414 shown in FIG. 4A, illustrates the terms used in Equations (1) and (2) for calculating vector 412. As shown, vector 412 is a vector component of wind vector 410. The heading 418 represents a reference heading (e.g. zero degrees). With reference to FIG. 4B, the terms "$\text{heading}_{cross\text{-}plume} - \text{heading}_{wind}$" are represented by "angle C-angle A, which equals angle B". The sine component of vector 410 provides vector 412 which is perpendicular to cross-plume extent 408.

According to one exemplary embodiment, the vertical CPL measurements may include vertical CPL measurements obtained in an area adjacent to in-plume area 402. For example, the vertical CPL measurements may include background vertical CPL measurements obtained in first area 404 adjacent to in-plume area 402. Accordingly, processor 304 may determine an in-plume CPL average value (Avg ($CPL_{vertical}$)) by subtracting the average of the background vertical CPL measurements in the first area 404 from the average of the vertical CPL measurements in the in-plume area 402.

In addition, the vertical CPL measurements may include vertical CPL measurements obtained in a plurality of areas adjacent to in-plume area 402. For example, the vertical CPL measurements may include background vertical CPL measurements obtained in first area 404 and second area 406 adjacent to in-plume area 402. Accordingly, processor 304 may determine an in-plume CPL average value (Avg ($CPL_{vertical}$)) by subtracting the average of the background vertical CPL measurements in the first area 404 and second area 406 from the average of the vertical CPL measurements in the in-plume area 402.

An application, titled "Determination of Gas Flux using Airborne DIAL LIDAR", filed on Nov. 24, 2008, as U.S.

patent application Ser. No. 12/276,686, describes a system and method for determining the emission rate of a gas from a point source. The point source, for example, may include a smokestack or a leaking pipeline. The system computes a concentration value from the gas plume by using a down-looking airborne differential absorption LIDAR (DIAL) and a wind vector derived externally of the aircraft carrying the DIAL system.

The inventors discovered that when obtaining the wind speed and heading from several of the closest available weather stations, the information obtained may be quite different in range. For example, during operational flights, the range of wind speeds from the closest public weather stations was 7-11 mph; and the range of wind headings from the closest public weather stations was 0-15 degrees. These uncertainties in wind speed and heading translate directly into large uncertainties in the measurement of the emission rate. For example, during the same operational flights, the range of emission rates calculated for methane was from 25,400 SCFH (standard cubic feet per hour) for the lowest wind speed provided by a weather station to 60,700 SCFH for the highest wind speed provided by a different weather station.

In an ideal situation, the wind vector would be determined by a weather station located at the exact location of the gas plume. This wind vector would be averaged over the distance and time required to carry the gas from the source to the DIAL system. Unfortunately, weather stations are rarely near the location of a gas source.

A current method of retrieving wind data for airborne natural gas emission LIDAR (ANGEL) services of ITT is to use online searches for nearby weather stations, but this method may be unreliable. Problems that may arise include instances of faulty or unavailable data. At times, the horizontal distance between the weather station and ANGEL's collection site may be as far as 30 miles. In addition, the search for data may consume hours of an analyst's time and the available data may not be accurate at the collection site.

Depending on the location of the weather station and the reporting time of the wind vector information, the reported data may be tens of miles away from the ANGEL system and may be as much as an hour old. Typically, wind vector information is obtained from a distance and, therefore, has a high degree of uncertainty at the gas source. In general, the uncertainty in wind vector information is the largest source of uncertainty in the gas flux estimation. Based on experience with over 90 natural gas pipeline leaks, the inventors' discovered that wind speed values from distant weather stations have an average uncertainty in speed value (maximum speed-minimum speed) of 3.1 mph and a relative range (maximum speed-minimum speed)/(average speed) of 70%, leading to a relative range in flux determinations of the same 70%.

As will be described, the present invention improves on the gas flux determination by using a wind vector that is determined at the same time (concurrently) and at the same location, as when the ANGEL data for the gas plume are obtained.

The present invention obtains accurate and timely local wind information and combines the information with airborne ANGEL area-integrated concentration (AIC) values to provide an accurate flux determination of the gas from a source. A wind measurement system, such as the Aircraft Integrated Meteorological Measurement System, AIMMS-20 (built by Aventech Research Inc, Barrie, Ontario, Canada), is placed in the aircraft and used to measure wind velocity. The resulting wind vector is accurate in speed to 1.2 mph and in heading to 0.2 degrees.

The wind information is obtained at the same time, and the same latitude and longitude as the ANGEL measurements. The wind information is taken at the flying altitude of the aircraft above the ground (AGL) (for example 1000 feet), whereas the plume is generally found at near-ground level (for example 20 feet). The present invention accounts for this difference by scaling the wind vector from the aircraft altitude above the ground to a near-ground altitude, and accomplishes the scaling at the same latitude and longitude in which the CPL values are determined. As will be explained, the present invention scales the wind vector to a near-ground height, based on a parameter called roughness length of the landscape at the source location. The value of this parameter may be obtained by analysis of visible imagery and/or ANGEL reflection height variability. Using this parameter, the system and method generates wind speeds at near-ground level that is accurate to approximately 1.4 mph. The improved wind accuracy leads to a substantial improvement in the accuracy of flux determination as compared to the system and method disclosed in the above referenced Patent Application, which obtains wind data from remote ground weather stations.

Because wind speed and wind direction vary substantially over small distances and short time-frames, and because the actual locations of gas sources are usually not known until found by the airborne ANGEL system, it is preferred to have wind measurements at the location and time of the airborne measurement. The system and method of the present invention obtains atmospheric wind speed and wind direction on the aircraft simultaneously with the ANGEL system measurements. In addition, the present invention scales the wind speed and wind direction from the aircraft height above ground to the near-ground height of the gas plume. The more accurate wind data are then combined with the CPL measurements of the ANGEL system and the cross-plume heading data in Equations (1) or (2) to provide a more accurate emission rate.

Systems for on-aircraft wind measurements are known. For example, the Aircraft Integrated Meteorological Measurement System, AIMMS-20 (Aventech Research Inc, Barrie, Ontario, Canada) measures wind speed accurately to 1.2 mph and wind direction accurately to 0.2 degrees at flight altitude.

Once the wind vector is obtained on the aircraft, the next step is to scale the wind measurements from flight altitude (for example, 1000 ft) to near-ground level (for example, 20 ft). The changes in wind speed and direction as a function of altitude have been the subject of study. For example, one such study, "Wind Velocities for Different Altitudes and Exposures" by Alexander Mitchell in the Monthly Weather Review of April, 1905 has been followed with several wind models. Examples include, P. Markowiski and Y. Richardson, "A Survey of Mesoscale Meteorology", The Pennsylvania State University, January, 2006; R. B. Stull, "An Introduction to Boundry Layer Meteorology", 1988 (Kluwer Academic Publishers, Dordrecht, the Netherlands); and the web site of the Danish Wind Industry Association, http://www.windpower.org/en/tour/wres/shear.htm.

Extrapolation of wind speed requires knowledge of a boundary layer, which is the lowest part of the Earth's atmosphere extending to above 3000 ft. This is also the layer in which the DIAL system flies at approximately 1000 ft. Various properties of the boundary layer, such as stability of the layer and vertical profile of the horizontal wind, change throughout the day. The boundary layer cycles between two regimes, convective boundary layer (CBL) and stable (nocturnal) boundary layer (SBL). Following sunrise, the CBL forms and after sunset, the SBL forms.

During the day, the Earth's surface is warmed by the sun, and a portion of the atmosphere in contact with the ground is heated. The air in the boundary layer becomes unstable and warm air accelerates upward. This convection causes turbulence and a nearly homogeneous atmosphere (the CBL) from the Earth's surface to the top of the boundary layer. At night, the Earth's surface and the portion of the atmosphere in contact with the surface begin to cool. A pool of cool air is formed (the SBL), stable to vertical motion, which is decoupled from the previous day's well-mixed layer, because lack of turbulence inhibits mixing. Fortunately, the vertical profiles of the wind for the CBL and SBL are similar close to the ground. This includes the vertical profile at approximately 1000 ft where the ANGEL system flies.

Figure 6B:
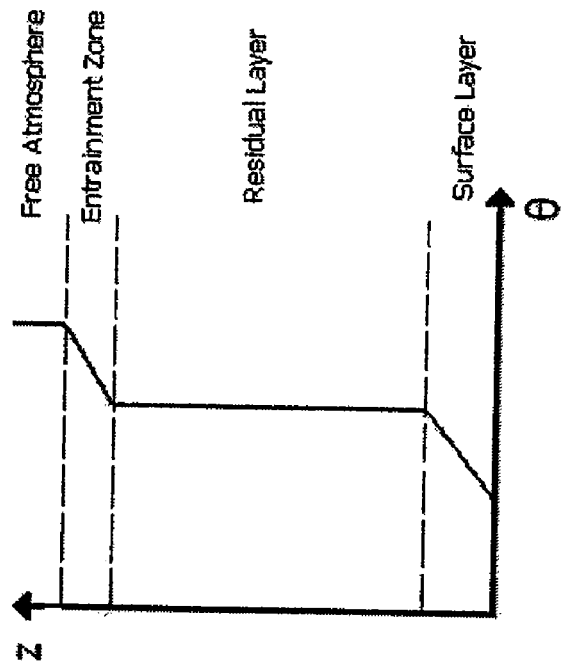
FIG. 6B is a plot of altitude versus temperature for the stable boundary layer (SBL) of the atmosphere formed during the night.
Figure 6A:
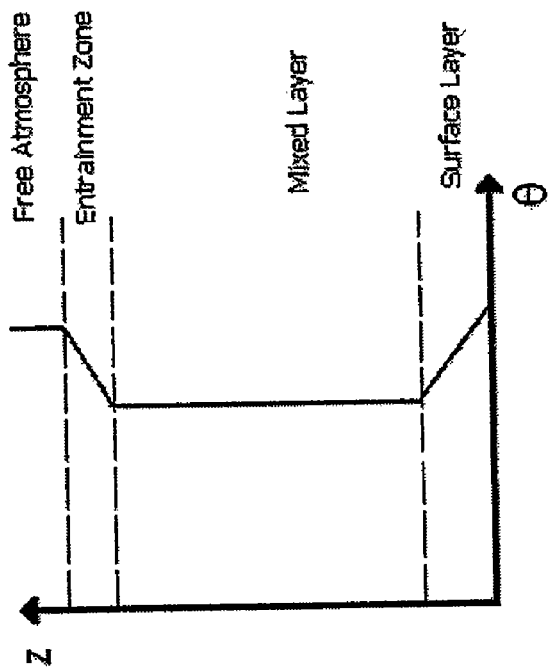
FIG. 6A is a plot of altitude versus temperature for the convective boundary layer (CBL) of the atmosphere formed during the day.

In addition, potential temperature is a useful measure of the stability of the atmosphere. Potential temperature at a certain pressure is the temperature that air acquires when it is brought to a standard reference pressure, usually 1000 millibars, as shown in Equation (3) below:

$$\theta = T\left(\frac{P_0}{P}\right)^{\frac{R}{c_p}} \quad (3)$$

where:
$\theta$=potential temperature (in K)
P=atmospheric pressure of air (usually in millibars)
$P_0$=standard reference pressure, usually 1000 millibars
T=temperature of air at pressure P (in K)
R=the gas constant of air, 287.058 $Jkg^{-1}K^{-1}$
$c_p$=the specific heat capacity of air, 1003.5 $Jkg^{-1}K^{-1}$ If the potential temperature decreases with increasing height, the atmosphere becomes unstable to vertical motion and convection is possible. Such is the case with the CBL. Under stable conditions, as with the SBL, the potential temperature increases with height and vertical motions are suppressed. FIGS. 6A and 6B depict potential temperature profiles for the two boundary layer regimes, where z is altitude (not drawn to scale). FIG. 6A is for the CBL and FIG. 6B is for the SBL.

Figure 7B:
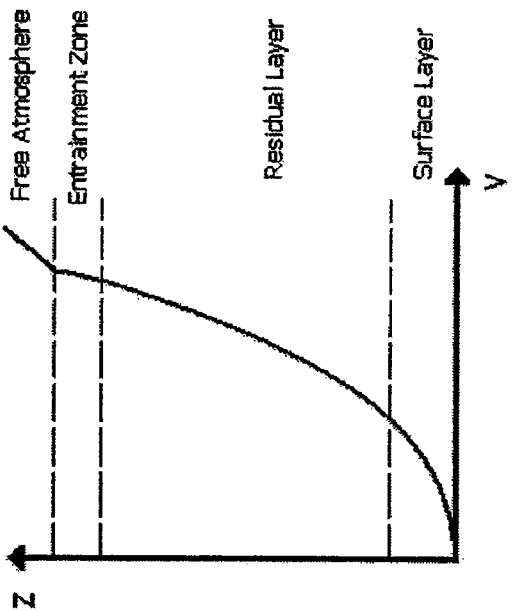
FIG. 7B is a plot of altitude versus horizontal wind speed for the stable boundary layer (SBL) of the atmosphere formed during the night.
Figure 7A:
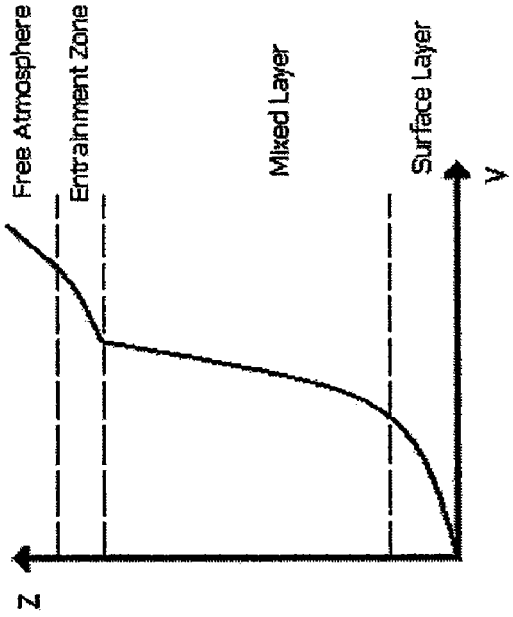
FIG. 7A is a plot of altitude versus horizontal wind speed for the convective boundary layer (CBL) of the atmosphere formed during the day.

The vertical profiles of the horizontal wind for the CBL and the SBL are similar at heights close to the surface, but differ at higher altitudes, as shown in FIGS. 7A and 7B, respectively.

At ground level, for example, at the interface of the atmosphere and the Earth's surface, the wind speed is zero due to friction. From there, wind speed increases with height. In the CBL, turbulence causes the effects of friction to be transported upward. At some height, the turbulence homogenizes the atmosphere to the extent that wind speeds are nearly constant with height. However, because of decoupling in the SBL, friction is no longer transported upward, and in the residual layer, wind speed continues to increase with height. Fortunately, at the altitude of the ANGEL services (1000 ft), the profiles of the two boundary layers are still very similar, so the present invention assumes that the method of extrapolating wind speed as a function of altitude is independent of the boundary layer type.

It is possible to fit a logarithmic function to the wind profile, as shown by Equation (4) below:

$$v = v_{ref}\frac{\ln(z/z_0)}{\ln(z_{ref}/z_0)} \quad (4)$$

where:
v=wind speed at height z above ground level.
$v_{ref}$=reference speed, i.e. the wind speed at height $z_{ref}$.
z=height above ground level for the desired velocity, v.

$z_0$=roughness length in the wind direction (see Table I below).
$z_{ref}$=reference height, 1000 ft in the case of ANGEL services.

The wind profile of Equation (4) is strongly influenced by ground cover at the surface of the Earth. At ground level, the wind speed is zero due to friction. If the surface of the Earth is very rough, or if hedgerows, trees or buildings are present, the height above ground-level, in which the wind speed remains zero increases. The height above ground in which the wind speed is zero is called the roughness length. A tabulation of roughness lengths as a function of the landscape type or the roughness class, published by the European Wind Atlas (I. Troen and F. I. Petersen, "European Wind Atlas", ISBN 87-550-1482-8, Risø National Laboratory, Roskide, Denmark (1989), is shown below as Table I:

TABLE I

Roughness Length as a Function of Landscape Type

| Roughness Class | Roughness Length (m) | Landscape Type |
|---|---|---|
| 0 | 0.0002 | Water Surface. Completely open terrain with smooth surface. |
| 0.5 | 0.0024 | Completely open terrain with smooth surface, e.g., concrete runways, mowed grass, etc. |
| 1 | 0.03 | Open agricultural area without fences and hedgerows and very scattered buildings. Only softly rounded hills. |
| 1.5 | 0.055 | Agricultural land with some houses and 8 meter tall sheltering hedgerows with distance of approx. 1250 meters. |
| 2 | 0.1 | Agricultural land with some houses and 8 meter tall sheltering hedgerows with distance of approx. 500 meters |
| 2.5 | 0.2 | Agricultural land with many houses, shrubs and plants, or 8 meter tall sheltering hedgerows with distance of approx. 250 meters |
| 3 | 0.4 | Villages, small towns, agricultural land with many or tall sheltering hedgerows, forests, and very rough and uneven terrain. |
| 3.5 | 0.8 | Larger cities with tall buildings. |
| 4 | 1.6 | Very large cities with tall buildings and skyscrapers. |

With Table I, it is possible to fit a logarithmic function to the wind profile of Equation (4). Equation (4), however, assumes a neutral atmosphere, where there is no heating or cooling of the Earth's surface. In addition, the equation assumes that the aircraft height is not high enough to encounter the homogeneity of the CBL's mixed layer or encounter a lack of friction in the SBL's residual layer. This assumption is reasonable for a 1000 ft flight altitude. It is also reasonable to assume that the estimated wind speed is slightly high in the CBL (daytime) case and slightly low in the SBL (nocturnal) case. Given the large differences in wind speeds and wind directions reported from multiple ground weather stations that are separated in location and reporting time, Equation (4) is much more accurate than the ground weather stations.

Equation (4) requires determination of the roughness type and roughness length. The present invention uses imagery obtained for the location of interest either from public sources or from the ANGEL system. The ground cover roughness may also be obtained from variations in the returns of the ANGEL system. These returns establish a landscape type. The landscape type is then used to determine the roughness length from Table I.

An assessment of data and imagery from various operational flights indicates that the landscape type, as defined in Table I, may be estimated to within a 0.5 value, except for cases in which there is a non-random windbreak upwind or downwind from the source. In case of a non-random windbreak, it is neither possible to use wind data derived from public weather stations, nor wind data derived from the aircraft. In such circumstance, the emission rate of the gas cannot be measured.

In a flight where roughness length can be determined, the present invention uses Equation (4) to calculate the wind speed ($v_{wind}$) at near-ground level (for example at 20 m above ground level) based on the wind speed measured at aircraft altitude. The plume heading or wind heading (heading$_{wind}$) at near-ground level may be the same as the wind heading at aircraft altitude. The present invention, however, prefers to determine the direction of the plume by using a plume heading detector, as shown in FIG. 3.

Finally, the average vertical CPL (Avg(CPL$_{vertical}$), cross-plume length ($L_{cross-plume}$), and cross-plume heading (heading$_{cross-plume}$) are obtained as explained above These values are used in Equation (1) or (2) to calculate an emission rate with improved accuracy.

As an example of accuracy improvement in the calculation of emission rate that the present invention achieves, variations in wind speed (which result proportionately in variations of emission rate) obtained from the closest available public weather stations were analyzed in over 90 natural gas pipeline leaks detected by the ANGEL services of ITT. The wind speeds have an average range (maximum speed−minimum speed) of 3.1 mph, and a relative range (maximum speed−minimum speed)/(average speed) of 70%. This, in turn, leads to a relative range in emission rate measurement of the same 70% (maximum flux−minimum flux)/(average flux).

For those same 90 natural gas pipeline leaks, imagery allowed the determination of the roughness class to within a range value of 0.5 (i.e., one of two adjacent classes in Table I). A large percentage of the roughness class was in Class 1.0; another large group (typically through forests) was in Class 3.0; and smaller groups were in class 1.0-1.5 or class 2.5-3.0

At an average 7 mph measured at 1000 ft above ground level (AGL), the difference in wind speeds at 20 meter AGL, calculated from Equation (3), corresponding to a roughness class range of 0.5 (between 2 adjacent classes) was 0.29 mph, and the average 20 meter wind speed was 4.4 mph. The commercially available AIMSS-20 (Aventech Research, Barrie, Ontario, Canada) specifies a wind speed accuracy of 1.2 mph at aircraft altitude. Because Equation (3) may not exactly model true atmospheric conditions, the inventors estimated an error in 20 meter AGL wind to correspond approximately to a roughness class error of 1.0, or 0.58 mph. The total error, when the three errors are convolved together (square-root $(0.29^2+1.2^2+0.58^2)$), becomes 1.4 mph. This result is more than twice improved over the average accuracy of wind speed data available from the nearest public weather station. Thus, the present invention provides a dramatic improvement in the relative range of emission rate measurements, from 70% using nearby public weather stations to approximately 30% using wind speed measured at aircraft altitude and scaled to 20 meter AGL.

Figure 5:
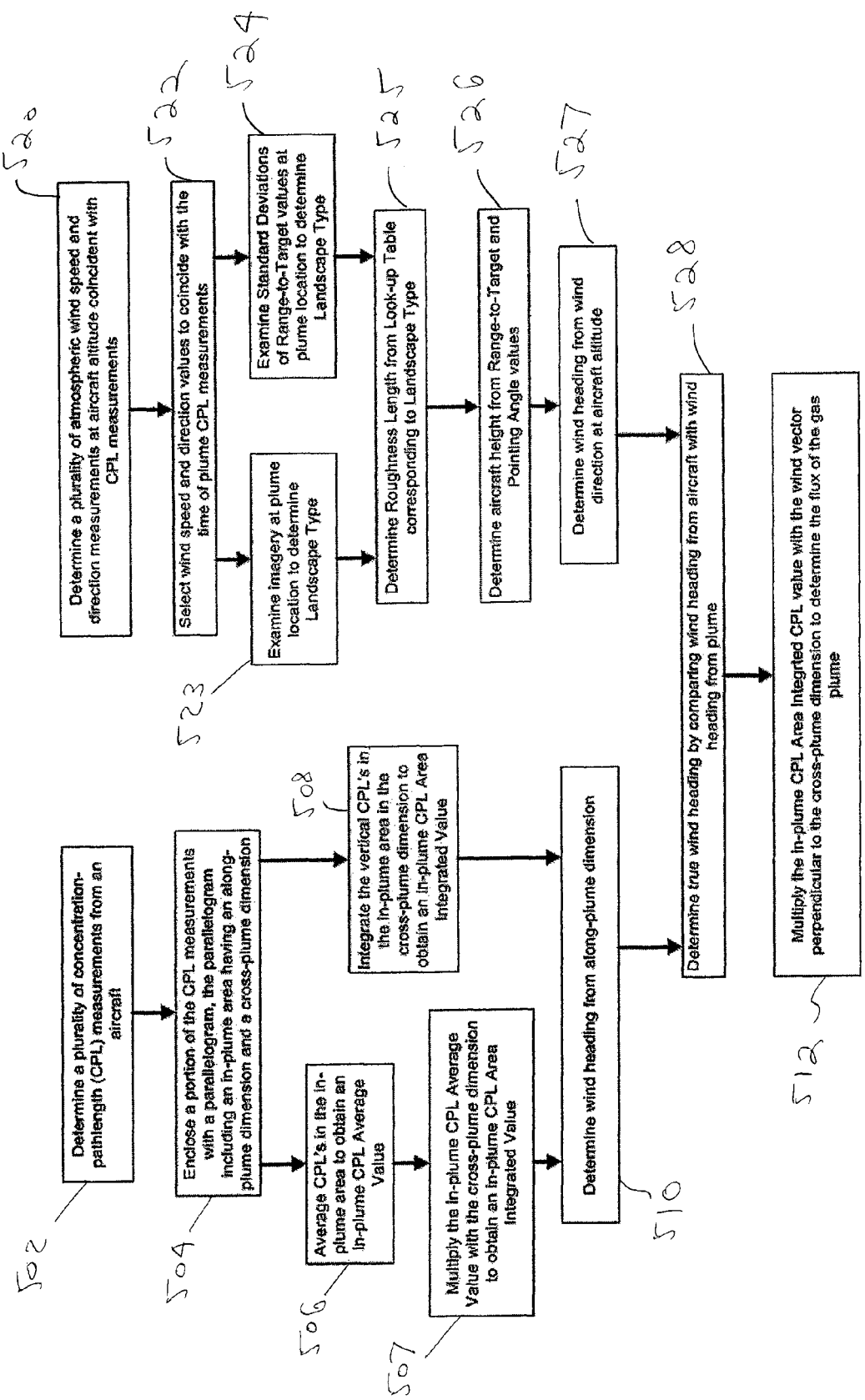
FIG. 5 is a flowchart illustrating a method for determining emission rate of a gas plume, according to an exemplary embodiment of the present invention.

Referring finally to FIG. 5, there is shown a flowchart illustrating an exemplary method for determining emission rate (flux) of a gas according to the present invention.

As shown at step 502, a plurality of concentration path length (CPL) measurements are determined by the ANGEL system from an aircraft. Determining the CPL values may include determining vertical CPL values in vertical columns from the airborne platform to the in-plume area. Further, each CPL value may include a gas concentration value multiplied by a height dimension extending from the aircraft to the in-plume area.

As shown at step 504, a portion of the CPL measurements is enclosed with a rectangle, or a parallelogram, such as the parallelogram enclosing in-plume area 402 shown at FIG. 4A. It is contemplated, however, that the portion of the in-plume area may be enclosed using other shapes. The parallelogram may include an in-plume area having a predetermined length dimension and a predetermined width dimension. The length dimension may be oriented along a track of the aircraft. The length dimension is shown in FIG. 4A, for example, as cross plume extent 408.

As shown at step 506, the CPL measurements in the in-plume area are averaged to obtain an in-plume CPL average value. As shown at step 507, the in-plume CPL average value may then be multiplied with the length dimension to obtain an in-plume area-integrated concentration (AIC) value. Alternatively, as shown in step 508, the CPL measurements located in the in-plume area may be integrated across the cross-plume extent to obtain a similar in-plume area-integrated concentration (AIC) value.

When the CPL values in the in-plume area are averaged, the vertical CPL measurements may include vertical CPL values obtained in at least one area adjacent to the in-plume area, such as adjacent areas 404 and 406 shown in FIG. 4A. If one adjacent area is used, the in-plume CPL average value may be determined by subtracting the average of the background vertical CPL measurements in either adjacent area 404 or 406 from the average of the vertical CPL measurements in the in-plume area 402. If both adjacent areas are used, the in-plume CPL average value may be determined by subtracting the average of the background vertical CPL measurements in both adjacent areas 404 and 406 from the average of the vertical CPL measurements in the in-plume area 402.

As shown at step 510, the wind heading along the plume direction may be determined. The plume direction may be different from the wind direction, as shown by vectors 410 and 416 in FIG. 4A. In general, however, they may be the same.

Referring now to the right side of FIG. 5, step 520 determines several atmospheric wind speed and wind direction measurements at aircraft altitude, using the onboard wind measuring system. These measurements are taken concurrently with the many CPL measurements. Step 522 selects a wind speed and wind direction, however, which coincides with the CPL values determined in the in-plume area shown in FIG. 4A. Thus, a representative wind speed and wind direction may be used for the entire in-plume area that has been selected by the operator.

The method next may scale the representative wind speed, which was selected by the operator and determined at aircraft altitude, down to the wind speed of the gas plume found at near ground level. First the method determines the landscape type from which the roughness length may be determined using Table I, for example. Two approaches are shown as steps 523 and 524. For example, the imagery of the plume may be examined to determine the landscape type, as shown by step 523. Alternatively, standard deviations of range-to-target values may be examined at the plume location to determine the landscape type, as shown by step 524.

Having determined the landscape type, the method next accesses a look-up-table (LUT) in step 525 to select a roughness length corresponding to the landscape type. An exemplary LUT is provided by Table I.

Scaling aircraft wind speed down to the plume wind speed requires knowledge of aircraft altitude, in order to use the logarithmic function shown by Equation (4). Step 526 obtains aircraft altitude by various available means, for example, by using a calculated range-to-target value and a pointing angle value of the optical beam.

Step 527 determines wind heading from the wind direction at the aircraft altitude using the onboard wind measuring system. By comparing the wind heading from the wind measuring system with the plume heading determined in step 510, the present invention determines a true wind heading in step 528. This true wind heading is finally used by step 512 to determine the flux of the emitting gas. The true wind heading is resolved into two components, one component along the cross-plume extent and another component perpendicular to the cross-plume extend. Taking the perpendicular component and multiplying it by either the in-plume area integrated CPL value or the average concentration value, as shown by Equations (1) and (2), respectively, the present invention obtains the flux of the emitted gas.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for remotely determining emission rate of a gas plume from a source comprising:
    an optical remote sensing system, disposed in an aircraft, for emitting an optical beam downwardly, along a length dimension of a flight path, and measuring differential absorption characteristics of the gas plume emitted at near ground level,
    a wind measuring system, disposed in the aircraft, for determining wind speed and wind heading at an altitude level of the aircraft, and
    a processor for determining emission rate of the gas plume, in response to (a) the differential absorption characteristics of the gas plume measured by the optical remote sensing system, and (b) the wind speed and wind heading determined by the wind measuring system,
    wherein the differential absorption characteristics include multiple concentration path length (CPL) values along a length dimension of the flight path, and
    the processor uses the multiple CPL values to determine either (a) an area-integrated concentration (AIC) value or (b) an average concentration value over a cross-plume extent, defined along the length dimension of the flight path,
    the processor receives the wind speed and wind heading from the wind measuring system and scales the wind speed from the aircraft altitude level to the near ground level of the gas plume,
    the processor adjusts the wind heading received from the wind measuring system after a comparison to a wind heading received from a plume heading detector disposed in the aircraft, and
    the processor uses the adjusted wind heading in determining the emission rate of the gas plume.

2. The system of claim 1 wherein
    the differential absorption characteristics include multiple concentration path length (CPL) values along a length dimension of the gas plume, and
    the length dimension of the gas plume is the same as the length dimension of the flight path.

3. The system of claim 2 wherein
    the CPL values are determined over an area defined by the length dimension of the gas plume and a width dimension, perpendicular to and smaller than the length dimension, and
    the width dimension is at least a width dimension of the optical beam.

4. The system of claim 3 wherein
    the width dimension is a width dimension extended by the optical beam in a conical scan mode.

5. The system of claim 1 wherein
    the processor scales the wind speed based on imagery of the gas plume, and the aircraft altitude level.

6. The system of claim 1 wherein
    the processor scales the wind speed based on a logarithmic function of a wind profile including a roughness length, and
    the roughness length is obtained from a look up table (LUT) stored in a memory device.

7. The system of claim 1 wherein
    the scaled wind speed and wind heading comprises a wind vector, and
    the processor multiplies either (a) the determined area-integrated concentration (AIC) value or (b) the average concentration value with a component of the wind vector, in which the component is defined by a vector perpendicular to the length dimension of the flight path.

8. The system of claim 1 wherein
    the optical remote sensing system includes an ANGEL system, and
    the wind measuring system includes an AIMMS-20 system.

9. An airborne system for obtaining an emission flux measurement of a gas plume, emanating from a source at a near ground altitude level, comprising:
    an airborne differential absorption lidar (DIAL) system for determining multiple concentration path length (CPL) values along a flight path, at ground level,
    an airborne wind measuring system (WMS) for determining a wind vector at aircraft altitude,
    a processor for receiving the multiple CPL values determined by the DIAL system and the wind vector determined by the WMS,
    the processor using the CPL values to compute either (a) an area-integrated concentration (AIC) value or (b) an average concentration value over a horizontal cross-plume extent, defined along the length dimension of the flight path,
    the processor scaling the wind vector to the near ground altitude level of the gas plume to obtain a scaled wind vector, and
    the processor obtaining the emission flux by multiplying either the AIC value or the average concentration value with a component of the scaled wind vector,
    wherein the component of the scaled wind vector is defined by a vector perpendicular to the length dimension of the flight path, and
    the area-integrated concentration (AIC) value or the average concentration value is based on averaging multiple CPL values located in a ground area, the ground area having (a) a length/dimension defined along the length dimension of the flight path and (b) a width dimension defined along a dimension perpendicular to the length dimension, and the multiple CPL values are dispersed throughout the ground area and fill the ground area.

10. The system of claim 9 wherein
the cross plume extent includes a predetermined length spanning at least a portion of the gas plume, and
a width dimension is included perpendicular to and smaller than the cross plume extent having at least a width of an optical beam transmitted by the DIAL system, and
the processor computes the AIC value or the average concentration value using the CPL values in the ground area formed by the cross plume extent and the width dimension.

11. The system of claim 10 wherein
the width dimension is an extended width dimension formed by the optical beam in a conical scan mode.

12. The system of claim 9 wherein
the processor scales the wind vector based on a logarithmic function of a wind profile including a roughness length, and
the roughness length is obtained from a look up table (LUT) stored in a memory device.

13. The system of claim 9 wherein
the processor receives the CPL values along the cross plume extent substantially concurrently with the wind vector.

14. A method of obtaining emission flux of a gas plume from an emission source and utilizing an airborne system, comprising the steps of:
obtaining multiple CPL values in a ground area, the ground area determined by a horizontal cross plume extent and a width dimension, wherein the cross plume extent is along a length dimension of a flight path and the width dimension is perpendicular to the length dimension;
receiving a wind vector from an onboard aircraft wind measuring system;
computing either (a) an area-integrated concentration (AIC) value or (b) an average concentration value, by averaging the multiple CPL values disposed within and filling the ground area;
scaling the wind vector to a near ground altitude level of the gas plume to obtain a scaled wind vector, and
multiplying either the AIC value or the average concentration value with a component of the scaled wind vector to obtain the emission flux of the gas.

15. The method of claim 14 wherein
multiplying with the component includes multiplying with a component of the scaled wind vector which is perpendicular to the cross plume extent.

16. The method of claim 14 wherein
the width dimension is at least of a size substantially similar to a size of an optical beam transmitted downwardly to obtain the CPL values.

17. The method of claim 14 wherein
obtaining the CPL values along the cross plume extent is performed substantially concurrently with receiving the wind vector from the onboard aircraft wind measuring system.

18. The method of claim 14 wherein
scaling the wind vector is based on a logarithmic function of a wind profile including a roughness length, and
the roughness length is obtained from a look up table (LUT) stored in a memory device.

* * * * *